(12) United States Patent
Snider

(10) Patent No.: US 10,870,336 B2
(45) Date of Patent: *Dec. 22, 2020

(54) VEHICLE WINDOW ASSEMBLY WITH DISPLAY

(71) Applicant: MAGNA MIRRORS OF AMERICA, INC., Holland, MI (US)

(72) Inventor: Darin J. Snider, Holland, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,090

(22) Filed: Sep. 30, 2019

(65) Prior Publication Data

US 2020/0023719 A1 Jan. 23, 2020

Related U.S. Application Data

(63) Continuation of application No. 16/057,988, filed on Aug. 8, 2018, now Pat. No. 10,427,503.

(Continued)

(51) Int. Cl.
| | |
|---|---|
| *B60J 1/20* | (2006.01) |
| *B60C 23/04* | (2006.01) |
| *G08B 21/18* | (2006.01) |
| *B60R 16/023* | (2006.01) |
| *G08B 5/36* | (2006.01) |
| *G08B 21/22* | (2006.01) |
| *F01M 11/10* | (2006.01) |

(Continued)

(52) U.S. Cl.
CPC ............ *B60J 1/20* (2013.01); *B60C 23/0406* (2013.01); *B60R 16/0231* (2013.01); *G08B 5/36* (2013.01); *G08B 21/182* (2013.01); *G08B 21/22* (2013.01); *B60C 23/02* (2013.01); *B60H 1/00985* (2013.01); *F01M 11/10* (2013.01); *F01M 2011/14* (2013.01)

(58) Field of Classification Search
CPC .... B60J 1/20; B60C 23/0406; B60R 16/0231; G08B 5/36; G08B 21/182
USPC ......................................................... 340/461
See application file for complete search history.

(56) References Cited

U.S. PATENT DOCUMENTS

| | | |
|---|---|---|
| 3,544,804 A | 12/1970 | Gaumer |
| 4,205,325 A | 5/1980 | Haygood et al. |

(Continued)

FOREIGN PATENT DOCUMENTS

DE 102013105328 A1 * 11/2014 ............. G01K 1/028

*Primary Examiner* — John A Tweel, Jr.
(74) *Attorney, Agent, or Firm* — Honigman LLP

(57) ABSTRACT

A vehicular window assembly includes a glass window panel and a display device. The display device includes a display element at the glass window panel and an electrical connector that extends from the display element for electrical connection to a wire harness of a vehicle. The display device is operable to backlight or illuminate at least one icon or alphanumeric character so that the at least one icon or alphanumeric character is viewable at the glass window panel by a person exterior the vehicle. With the window assembly mounted at a vehicle, the display device may be activated to backlight or illuminate the at least one icon or alphanumeric character to indicate at least one vehicle status, and may include indication responsive at least in part to determination that an in-cabin temperature of the vehicle is above a threshold level.

16 Claims, 11 Drawing Sheets

Related U.S. Application Data

(60) Provisional application No. 62/543,554, filed on Aug. 10, 2017.

(51) Int. Cl.
  *B60C 23/02* (2006.01)
  *B60H 1/00* (2006.01)

(56) References Cited

U.S. PATENT DOCUMENTS

| | | | |
|---|---|---|---|
| 5,551,197 A | 9/1996 | Repp et al. | |
| 5,640,216 A * | 6/1997 | Hasegawa | G02F 1/1345 |
| | | | 349/58 |
| 5,698,906 A * | 12/1997 | Gardner | E05B 41/00 |
| | | | 307/9.1 |
| 5,724,161 A * | 3/1998 | Smith | G02B 27/0103 |
| | | | 349/34 |
| 5,853,895 A | 12/1998 | Lewno | |
| 6,446,375 B1 * | 9/2002 | Davis | G09F 3/20 |
| | | | 40/591 |
| 6,617,975 B1 | 9/2003 | Burgess | |
| 6,691,464 B2 | 2/2004 | Nestell et al. | |
| 7,003,916 B2 | 2/2006 | Nestell et al. | |
| 7,073,293 B2 | 7/2006 | Galer | |
| 7,248,151 B2 | 7/2007 | McCall | |
| 7,626,749 B2 * | 12/2009 | Baur | B32B 17/10174 |
| | | | 359/265 |
| 7,911,321 B2 | 3/2011 | Bingle et al. | |
| 8,400,265 B2 | 3/2013 | Sarioglu et al. | |
| 8,402,695 B2 | 3/2013 | Smith et al. | |
| 8,830,141 B2 * | 9/2014 | Seder | B32B 17/10036 |
| | | | 345/7 |
| 8,881,458 B2 | 11/2014 | Snider et al. | |
| 8,994,495 B2 | 3/2015 | Dassanayake et al. | |
| 9,038,294 B2 * | 5/2015 | Meza | G09F 13/06 |
| | | | 40/491 |
| 9,403,477 B2 * | 8/2016 | Richard | B60Q 1/268 |
| 9,807,196 B2 * | 10/2017 | Pisz | B60K 37/00 |
| 10,427,503 B2 | 10/2019 | Snider | |
| 2003/0213179 A1 | 11/2003 | Galer | |
| 2004/0020131 A1 | 2/2004 | Galer et al. | |
| 2005/0099287 A1 * | 5/2005 | Su | B60Q 1/22 |
| | | | 340/464 |
| 2006/0098290 A1 * | 5/2006 | Fernando | B32B 17/10036 |
| | | | 359/609 |
| 2006/0107600 A1 | 5/2006 | Nestell et al. | |
| 2008/0127563 A1 | 6/2008 | Tooker | |
| 2009/0113775 A1 * | 5/2009 | Netter | G06Q 30/02 |
| | | | 40/591 |
| 2010/0096647 A1 * | 4/2010 | Van Herpen | B32B 17/10036 |
| | | | 257/91 |
| 2014/0170357 A1 | 6/2014 | Tooker et al. | |
| 2016/0016520 A1 * | 1/2016 | Meyer | B60R 13/00 |
| | | | 116/28 R |
| 2017/0066305 A1 | 3/2017 | Tooker et al. | |
| 2017/0246984 A1 | 8/2017 | Snider | |
| 2018/0094471 A1 | 4/2018 | Mitchell | |
| 2018/0281697 A1 | 10/2018 | Snider et al. | |
| 2019/0005755 A1 | 1/2019 | Snider et al. | |

* cited by examiner

VEHICLE WINDOW ASSEMBLY WITH DISPLAY

CROSS REFERENCE TO RELATED APPLICATIONS

The present application is a continuation of U.S. patent application Ser. No. 16/057,988, filed Aug. 8, 2018, now U.S. Pat. No. 10,427,503, which claims the filing benefits of U.S. provisional application Ser. No. 62/543,554, filed Aug. 10, 2017, which is hereby incorporated herein by reference in its entirety.

FIELD OF THE INVENTION

The present invention relates to window assemblies for vehicles and, more particularly to a side or rear fixed window assembly for a vehicle.

BACKGROUND OF THE INVENTION

It is known to provide an interior cabin sensor that can determine presence of an occupant in a vehicle. It is also known to provide a temperature sensor operable to determine an in-cabin temperature of the vehicle.

SUMMARY OF THE INVENTION

The present invention provides a vehicle window assembly that comprises a display device disposed at and behind a glass window panel. The display device is operable to backlight or illuminate one or more alphanumeric characters and/or icons (such that light emitted by an illumination source of the display device passes through the formed alphanumeric characters and/or icons) such that one or more icons may be viewable by a person exterior the vehicle. The display device is activated responsive to a triggering event, such as determination that the in-cabin temperature exceeds a threshold value (optionally in conjunction with determination that there is an occupant in the vehicle and determination that the vehicle is parked), or such as determination that a person is refueling the vehicle (where the display device may be at the window at or above the fuel filler door or port location).

These and other objects, advantages, purposes and features of the present invention will become apparent upon review of the following specification in conjunction with the drawings.

DESCRIPTION OF THE PREFERRED EMBODIMENTS

Figure 1:
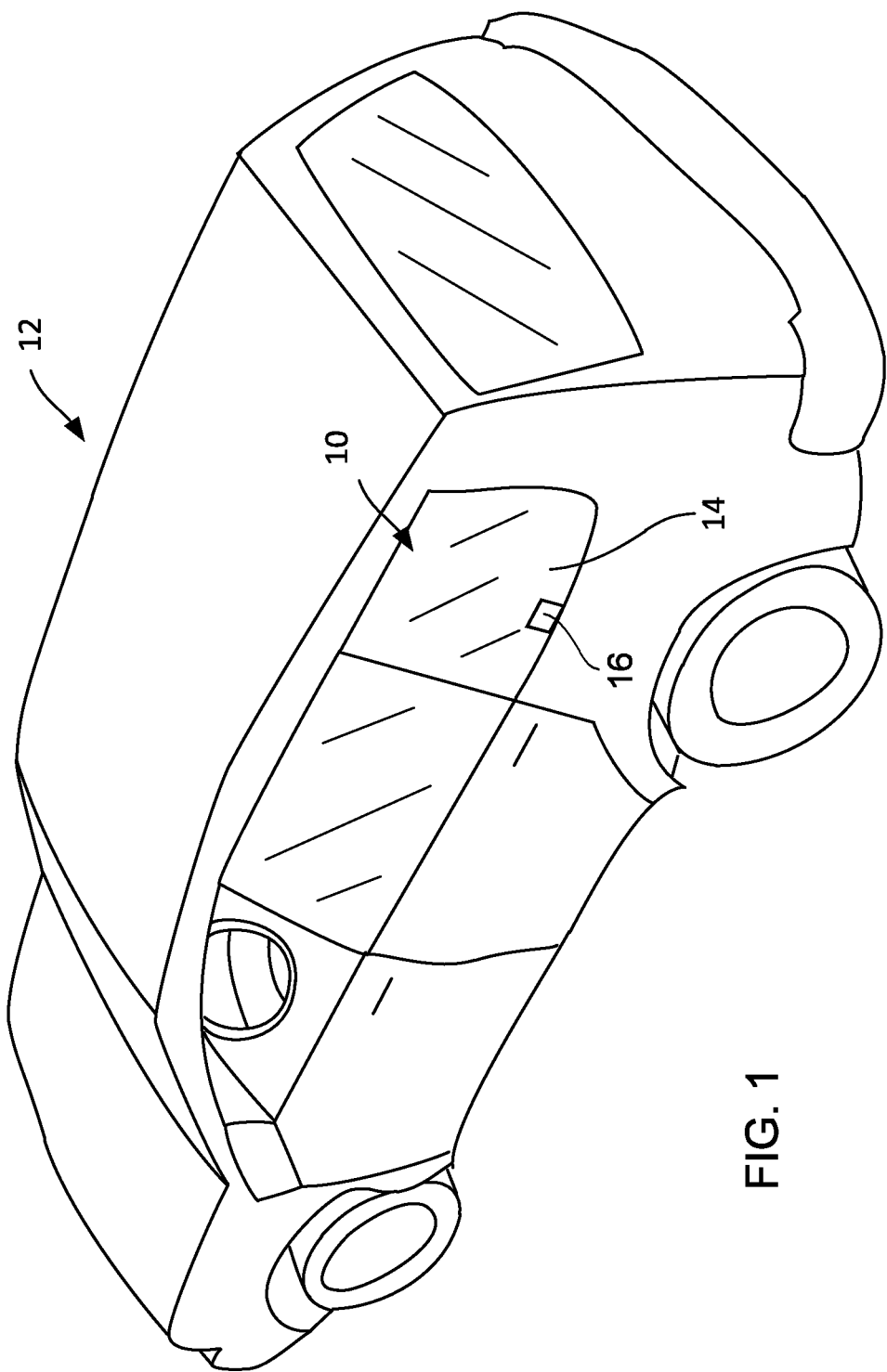
FIG. 1 is a perspective view of a vehicle having a window assembly in accordance with the present invention.

Referring now to the drawings and the illustrative embodiments depicted therein, a window assembly 10 of a vehicle 12 comprises a glass window panel 14 with a display device 16 disposed at a perimeter region of the glass panel 14 (FIG. 1). The display device includes an illumination source (such as a light emitting diode (LED) or the like) that is operable to backlight or illuminate an iconistic mask or element or thin film transistor (TFT) display or the like, such that the icon that is backlit is viewable through the window panel by a person exterior the vehicle. The display device is operable to display an alert or icon responsive to a determination that the in-cabin temperature of the vehicle is at or above a threshold level.

The display device may display or illuminate or backlight an icon (such as one of the icons of FIGS. 8A-D) that indicates to a person viewing the window and the display region that the temperature is at or above a temperature threshold. For example, if an in-cabin temperature sensing system (or an interior sensor that is part of the display device) senses or determines an in-cabin temperature of 90 degrees or greater, or 100 degrees or greater, the display device is activated to display the alert/icon to alert passersby that the interior vehicle temperature is at an unsafe temperature for its occupants. The display device may display at a constant manner and intensity, or the display device may increase intensity or change color of the displayed icon or flash or intermittently display the icon responsive to the temperature increasing above a second threshold level that is above the first threshold level.

Optionally, the display device may be further operable to display the alert/icon responsive to the elevated temperature and further responsive to a determination that there is an occupant in the vehicle (such as may be determined via a cabin monitoring system or the like of the vehicle). Thus, if no one is in the vehicle, the display device will not display the alert/icon regardless of the interior temperature. The display device thus only provides the alert when it is important to do so (i.e., when there is a living being, such as a child or a pet, in the vehicle).

Optionally, the display device may be operable to display the alert/icon responsive to the elevated temperature and responsive to a determination that there is an occupant in the vehicle, and further responsive to a determination that the vehicle is parked. Thus, if the vehicle is being driven, the display device will not display the alert/icon regardless of the interior temperature and/or detected occupant.

Optionally, the display device may generate an output to another device, such as to a vehicle audible device, such as the vehicle horn or the like. Thus, responsive to determination that the vehicle is parked, an occupant is in the vehicle, and the in-cabin temperature is above a threshold temperature, the system may activate the window display and may also activate the horn of the vehicle. Clearly, other alerts may be provided to draw attention to the hot occupied parked vehicle, and such alerts may include a communication to a remote device, such as the vehicle owner's smart phone or to an emergency contact or to the police or fire department or the like. The communication may indicate the condition and situation, and may provide location information so the notified person can quickly arrive at the vehicle.

Figure 2:
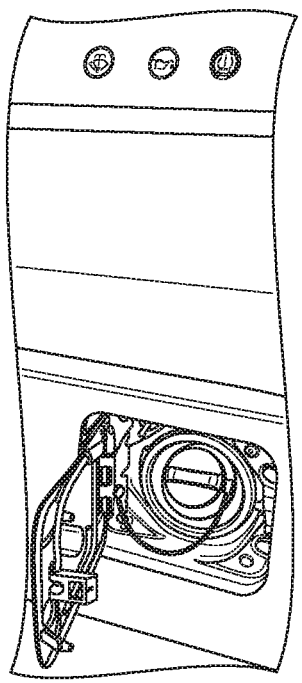
FIG. 2 is a perspective view of a side region of a vehicle with the display device and window assembly of the present invention.
Figure 3:
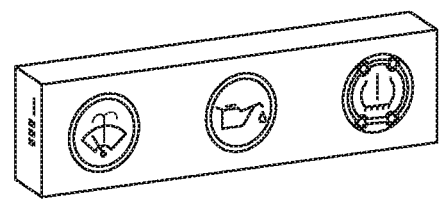
FIG. 3 is a perspective view of the display device.
Figure 4:
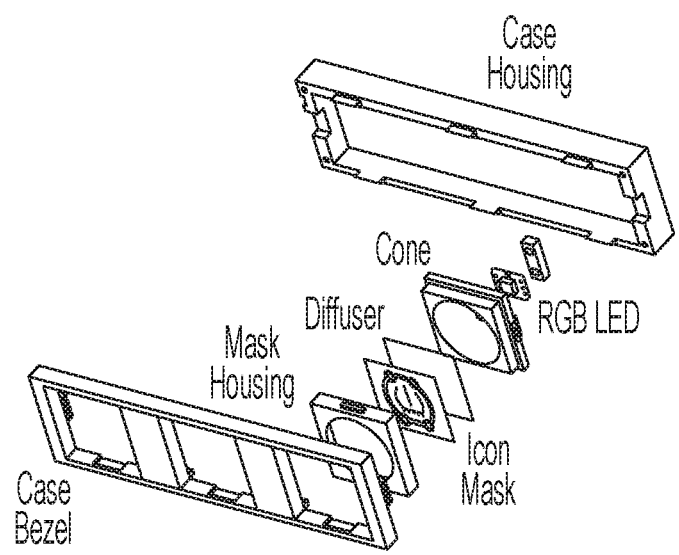
FIG. 4 is an exploded perspective view of the display device.
Figure 5:
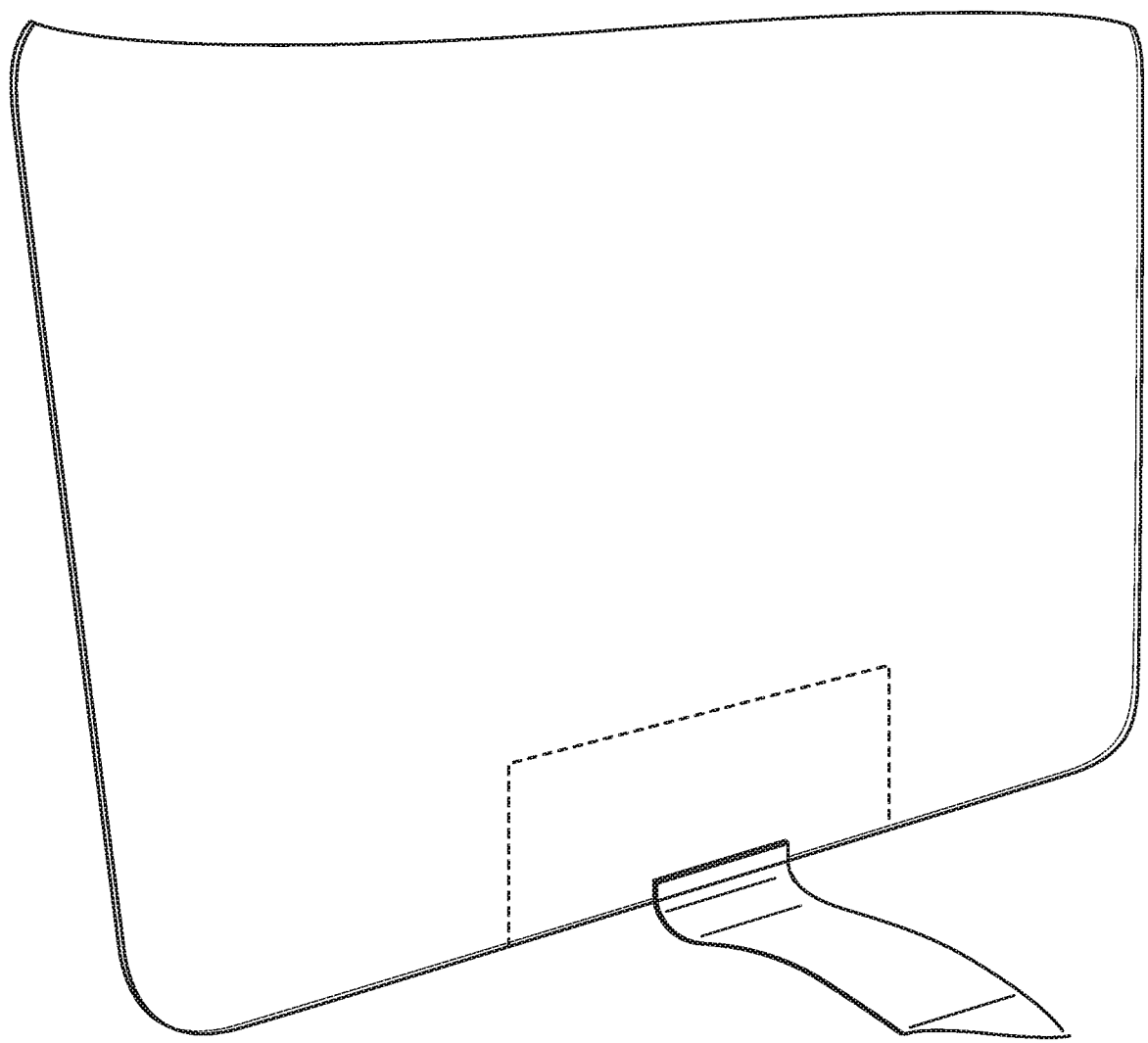
FIG. 5 is a perspective view of a window assembly with a display device of the present invention, shown with the display device deactivated.
Figure 6:
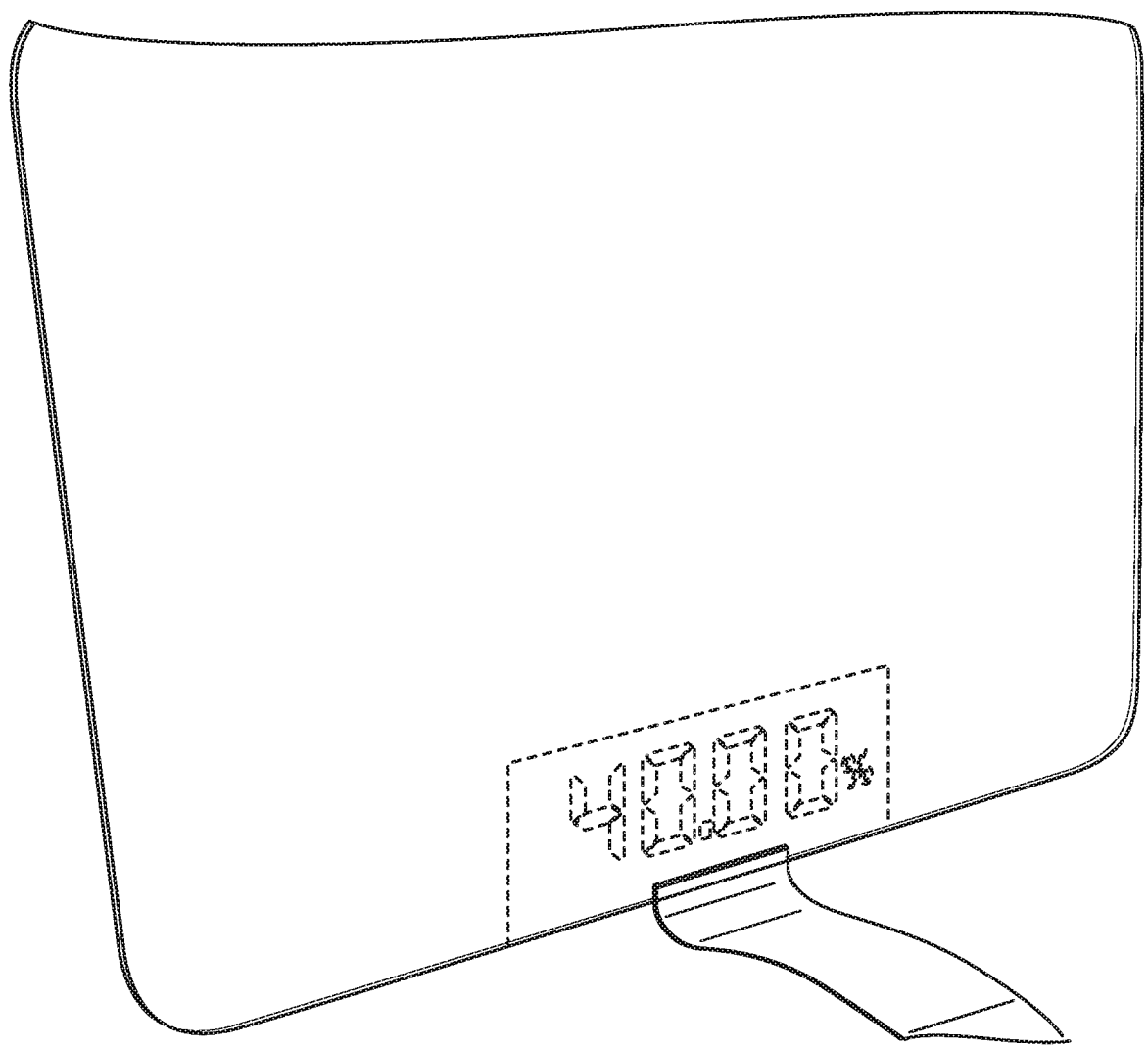
FIG. 6 is another perspective view of the window assembly of FIG. 5, shown with the display device activated.
Figure 7:
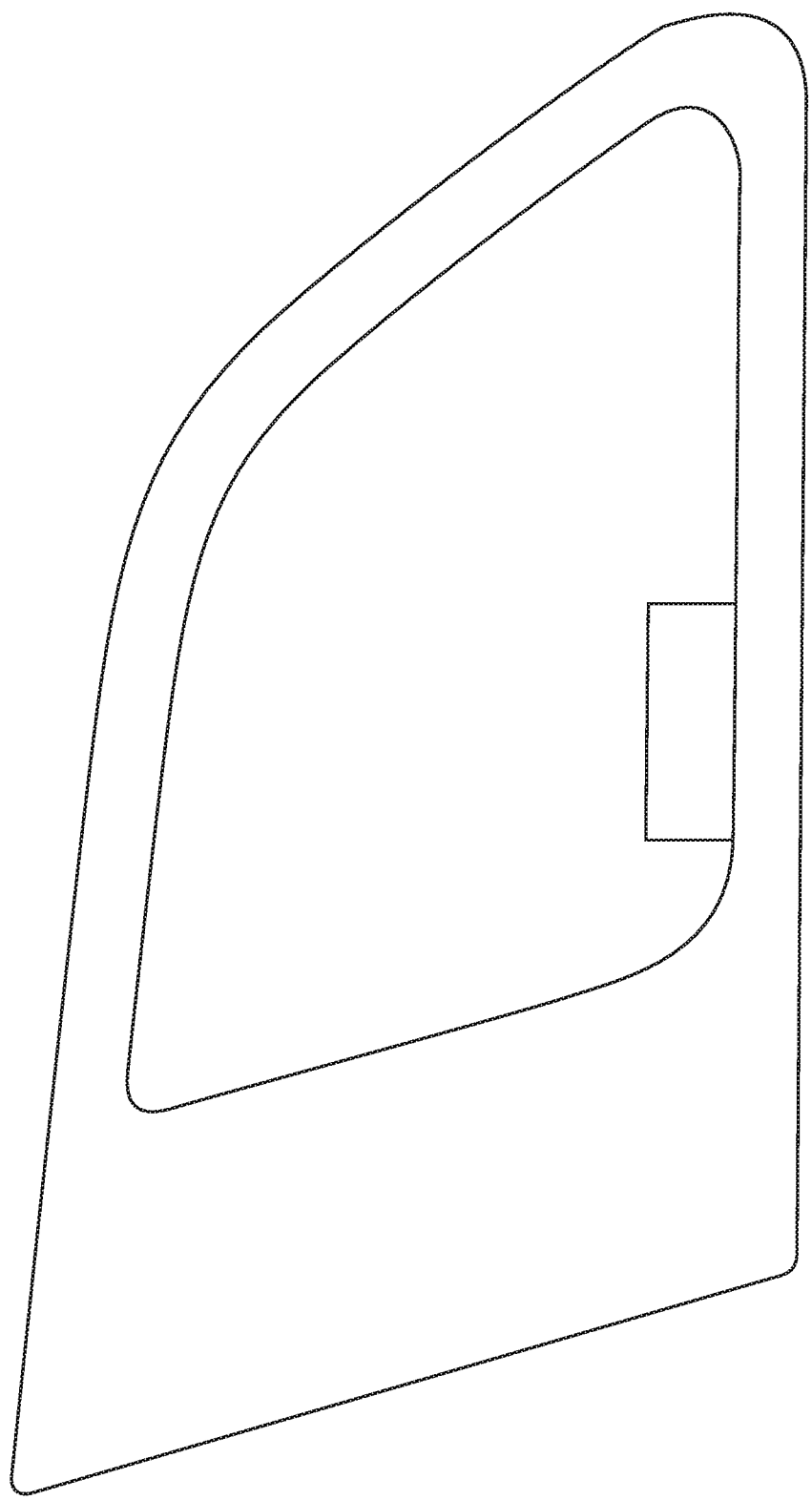
FIG. 7 is a side plan view of another window assembly with a display device of the present invention.
Figure 8A:
FIGS. 8A-D are images of optional icons that can be used to indicate that the in-cabin temperature of the vehicle is at or above a threshold temperature.
Figure 8B:
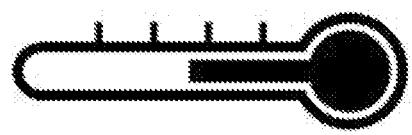
Figure 8C:
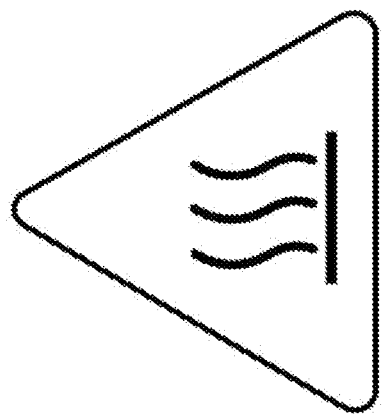
Figure 8D:
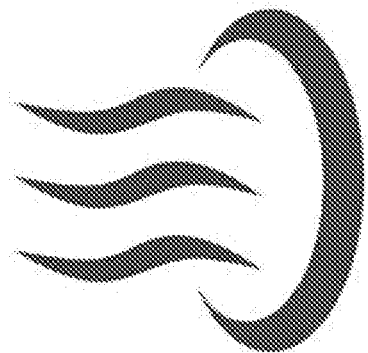
Figure 9:
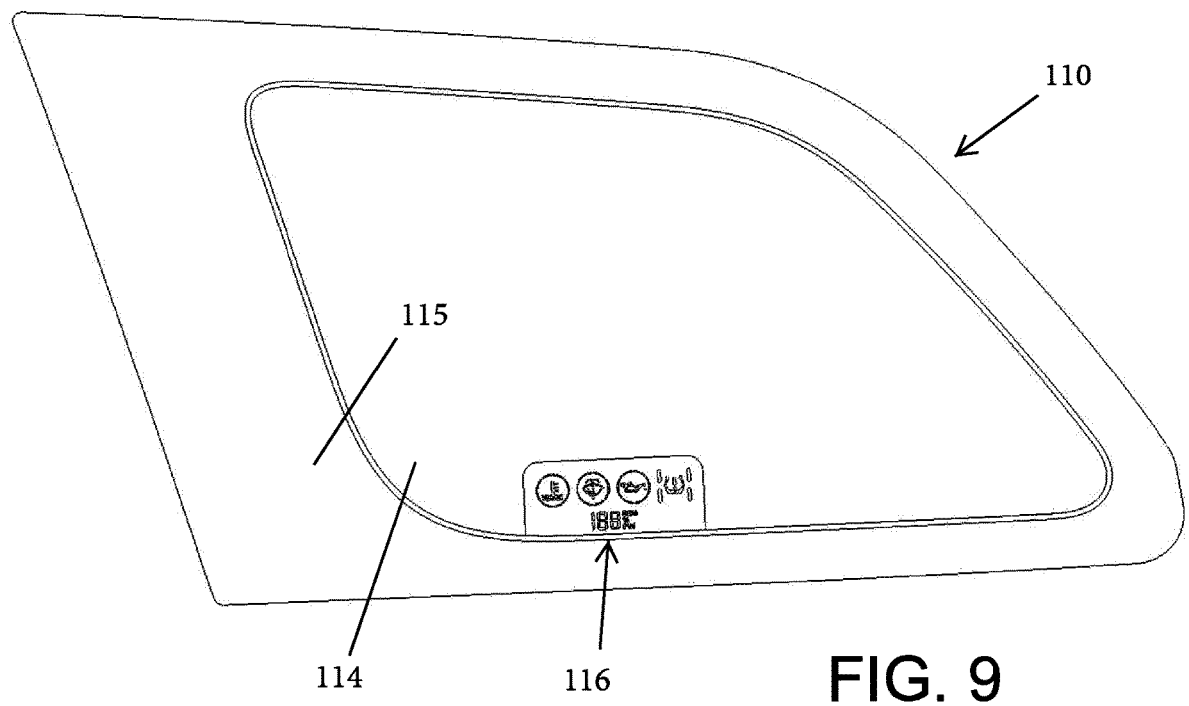
FIG. 9 is a side elevation of another window assembly with an iconistic display device.
Figure 10A:
FIGS. 10A-E are images of optional icons that may display information at the window assembly.
Figure 10B:
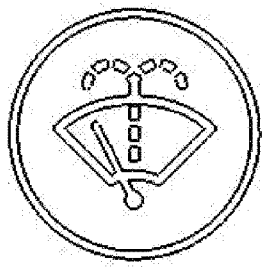
Figure 10C:
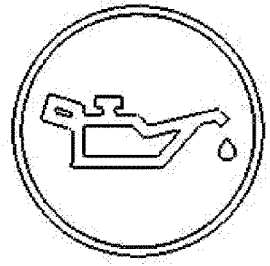
Figure 10D:
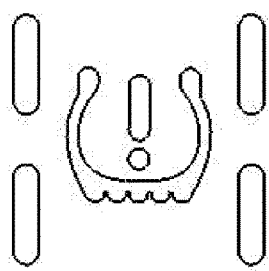
Figure 10E:
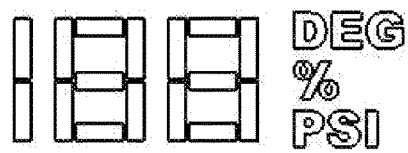
Figure 12:
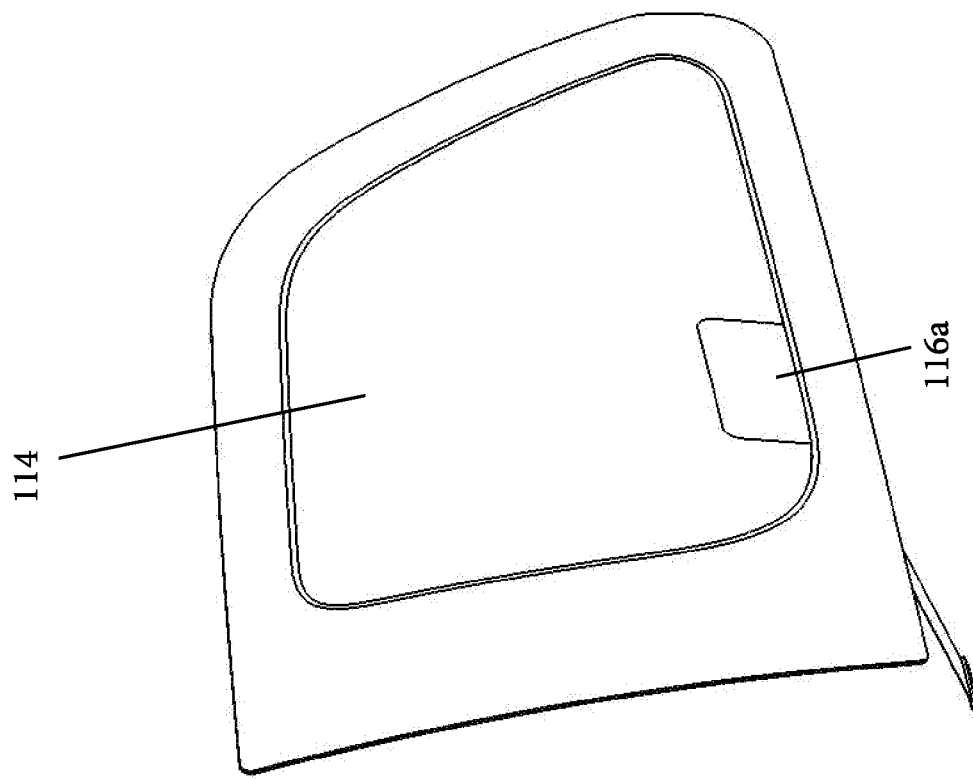
FIG. 12 is another perspective view of the window assembly, with no icons being activated for display.
Figure 11:
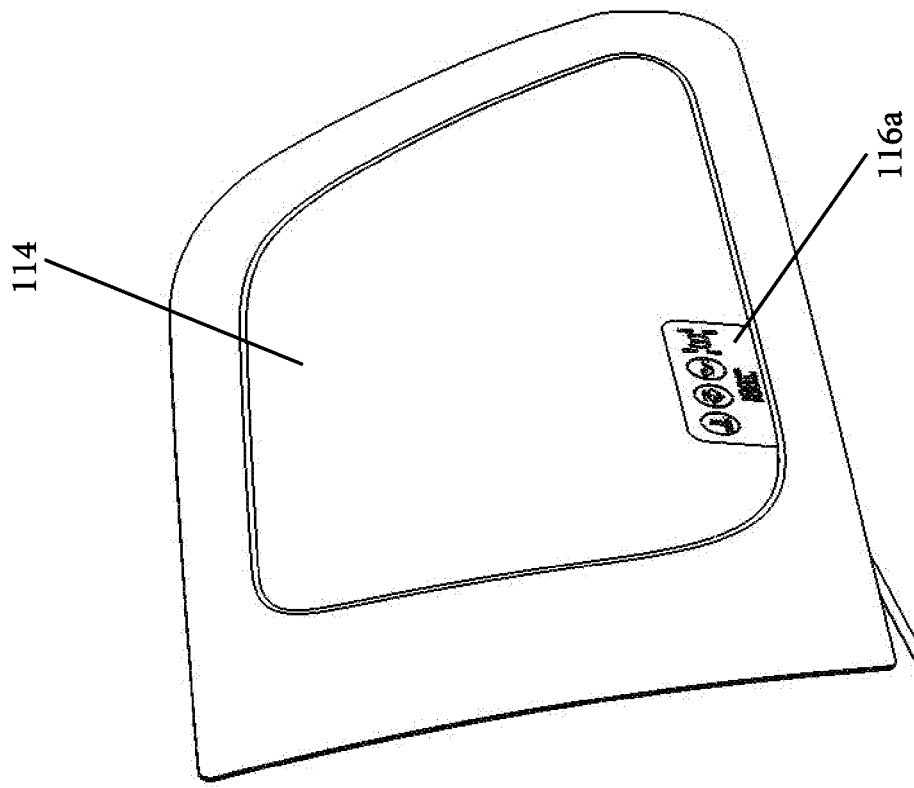
FIG. 11 is a perspective view of the window assembly of FIG. 9.

The display device may illuminate or backlight or otherwise project an icon such as via illuminating a masking element disposed between the illumination source and the window panel (such as shown in FIGS. 2-4). Optionally, the display device may comprise a reconfigurable display device that may selectively display multiple characters and/or icons to convey other information to the person viewing the display device from exterior the vehicle. For example (and with reference to FIGS. 5 and 6), the display device may comprise a reconfigurable display device that is not readily viewable or discernible when deactivated (FIG. 5) and is viewable when activated (FIG. 6) to selectively display various alphanumeric characters to convey the desired or selected information. The display device may also (or otherwise) display various vehicle diagnostics or system status indicators, such as engine temperature, tire pressure, oil life, battery life, etc. The display device thus may be disposed at a window at or near or above the fuel filler area or port or door of the vehicle (see FIG. 2) so that the display may be activated responsive to determination that a user is filling the vehicle's fuel tank, and so that the person may view the vehicle status information while refueling the vehicle.

Thus, the display device or system of the present invention provides a safety/convenience feature that displays information such as the vehicle's fluid maintenance status, tire pressures, and other information accessible to driver during refueling. The display device may comprise an LCD or OLED display mounted at the window and within the person's sight near the fuel filler door or port. The system may be activated to display the information responsive to the fuel door being opened. The display device may be customized to match OEM instrument panel graphics and content themes. The display device may be electrically connected to the vehicle's communication network bus or CAN bus to allow for diagnostic, security, and telematics information display at the discretion of the OEM.

The display device is disposed behind the window panel at an interior surface of the window panel. The display device may be adhered to the window panel or may be attached or retained thereat via any other suitable means. For example, the display device may be overmolded by a perimeter window encapsulant or the like, which is overmolded along the periphery of the window panel. The display device may be electrically connected to a wire harness of the vehicle or may electrically connect to one or more electrically conductive traces established at the interior surface of the vehicle window, such as by utilizing aspects of the window assemblies described in U.S. Publication No. US-2017-0246984, which is hereby incorporated herein by reference in its entirety.

The window assembly comprises a fixed or non-openable window (such as a rear side or rear quarter window as shown in the illustrated embodiment). Optionally, the display system of the present invention may be suitable for use in a movable or openable/closable window assembly, such as a rear liftgate window assembly. Optionally, the display system of the present invention may be suitable for use in a movable or slidable (such as horizontally slidable or vertically slidable) window assembly, where the display device may be disposed at an interior portion of the movable window panel that is encompassed by an interior trim of the vehicle, or where the display device is thin enough and may be overcoated or overmolded (such as by a window perimeter encapsulant) so that the display device is not readily noticeable at the interior surface of the window panel when the window panel is closed.

The window panel may have the ceramic frit layer (or other suitable darkening or hiding layer) established via any suitable means, such that the window panel has a dark or black or opaque perimeter region. The display device may be disposed at and behind the opaque layer, and the icons or characters, when back lit or illuminated, may be viewable through the opaque layer (such as through icons or characters established through the opaque layer such as via masking or etching or the like). Optionally, the display screen or element may be disposed at a transparent region of the window panel.

Optionally, and with reference to FIGS. 9-16, a vehicular window assembly 110 comprises a glass window panel 114 with a display device 116 disposed at a perimeter region of the glass panel 114. The display devices comprises a plurality of icons (FIGS. 10A-E) to display various information, such as temperature inside the vehicle, engine oil temperature, vehicle status (such as oil life, wiper fluid low level, tire pressure warning, and/or may include an alphanumeric icon or element (FIG. 10E) to provide numeric values for one or more of the status indicators. The display device includes a plurality of illumination sources (such as light emitting diodes (LEDs) or the like) that are operable to backlight or illuminate respective icons or portions of an iconistic mask or element or thin film transistor (TFT) display or the like, such that a selected or appropriate icon or icons that is backlit is viewable through the window panel by a person exterior the vehicle. The display device may backlight and display an alert or icon and may also backlight and display a numeric value for the system or accessory or situation that the displayed alert or icon represents. For example, responsive to a determination that the in-cabin temperature of the vehicle is at or above a threshold level, the display device may activate the LEDs to illuminate the icon of FIG. 10A, and may also activate or illuminate the appropriate portions of the alphanumeric element of FIG. 10E to indicate the current temperature in the vehicle cabin.

The display device 116 includes a flat display film 116*a* that may be selectively powered or energized to illuminate the appropriate or selected icons or alphanumeric characters of the display device. The display device 116 also includes an electrical lead or wire or conductive trace 116*b* that extends from the display film 116*a* for electrical connection to a vehicle wire harness when the window assembly is installed at a vehicle.

Figure 13:
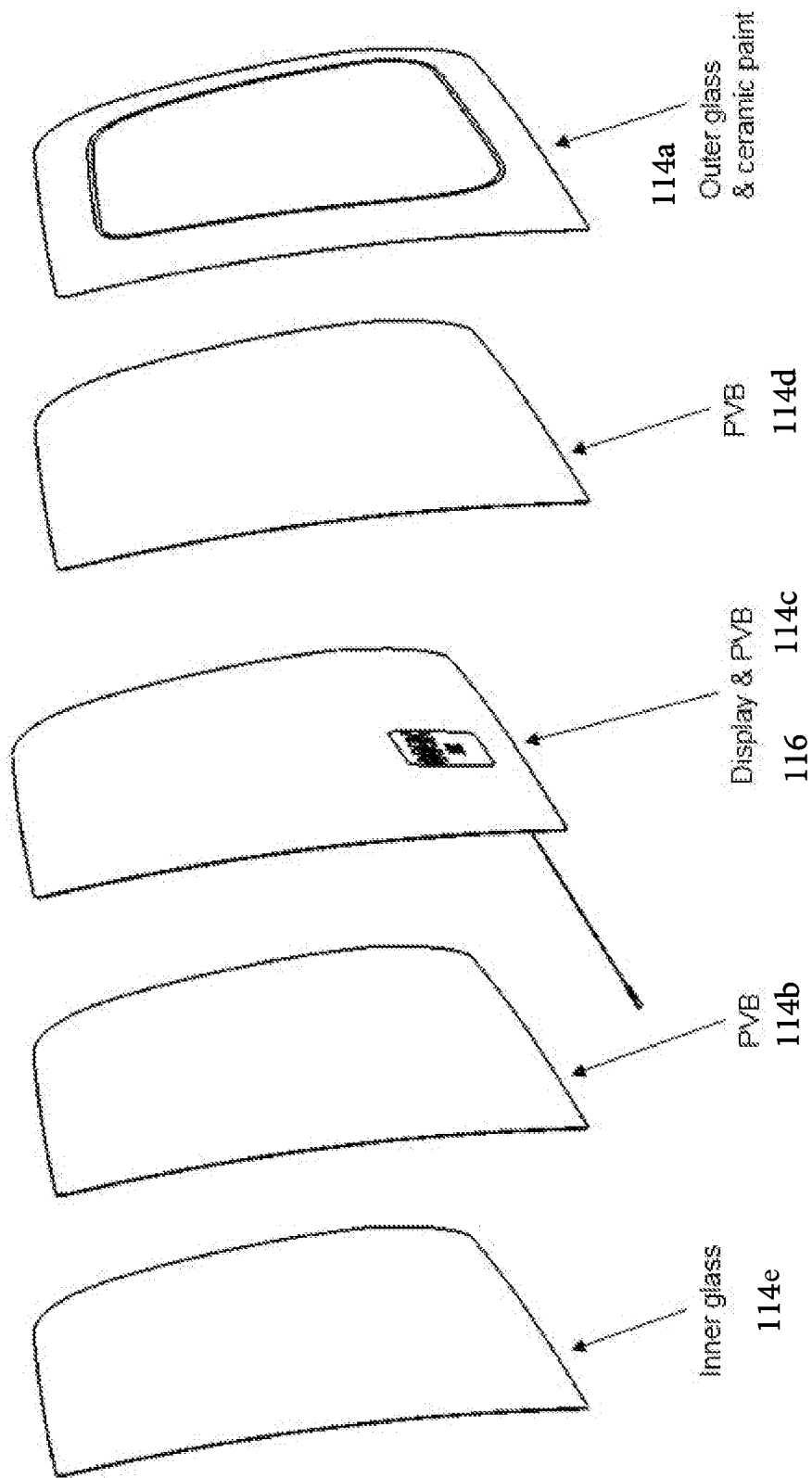
FIG. 13 is an exploded perspective view of a laminated window assembly having the display device attached at a PVB layer.
Figure 14:
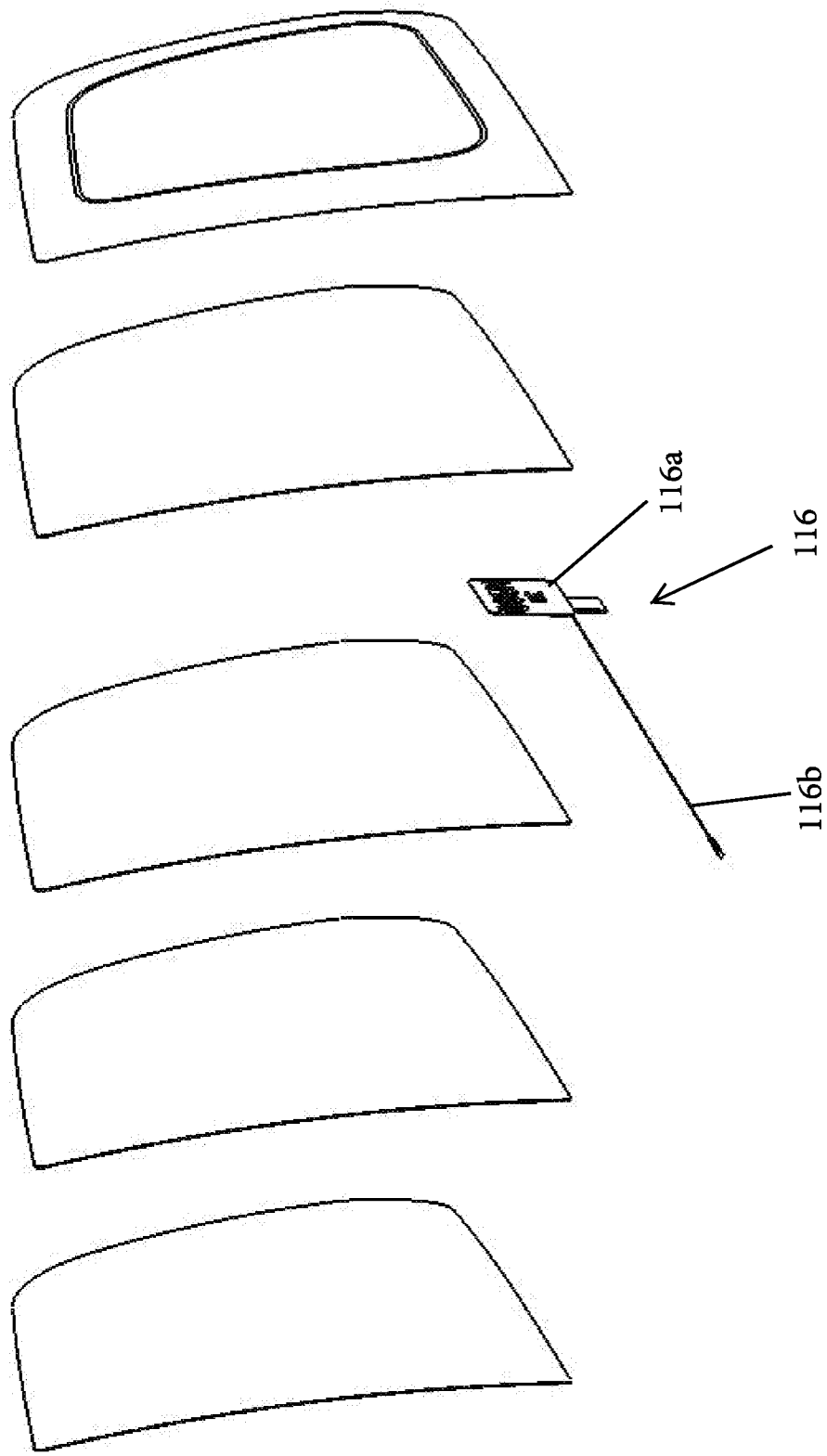
FIG. 14 is an exploded perspective view of another laminated window assembly having the display device disposed between two PVB layers.
Figure 16:
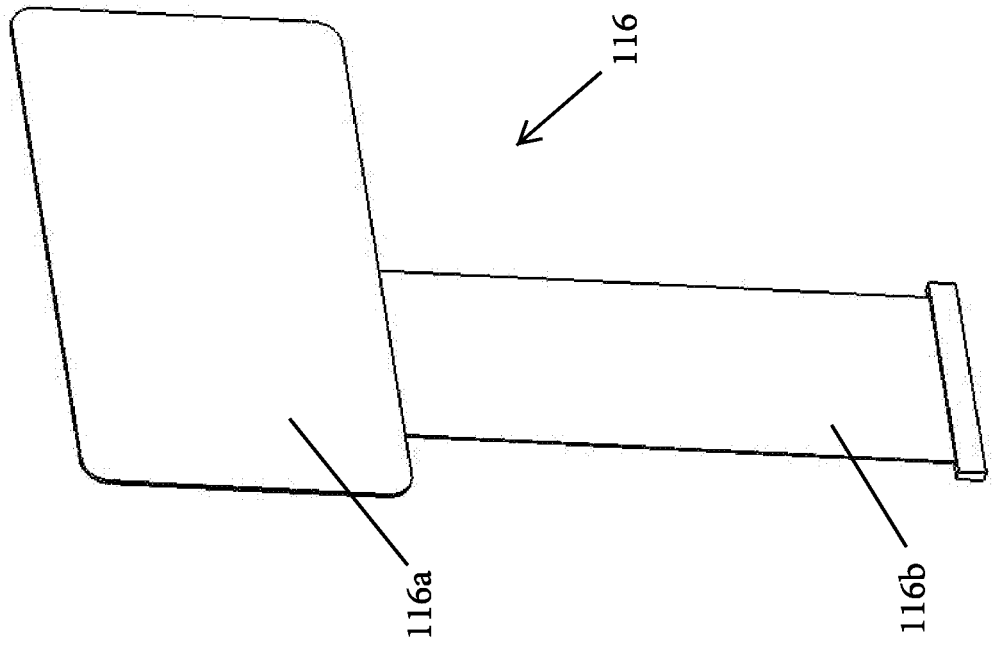
FIG. 16 is another perspective view of the display device, with no icons being activated for display.
Figure 15:
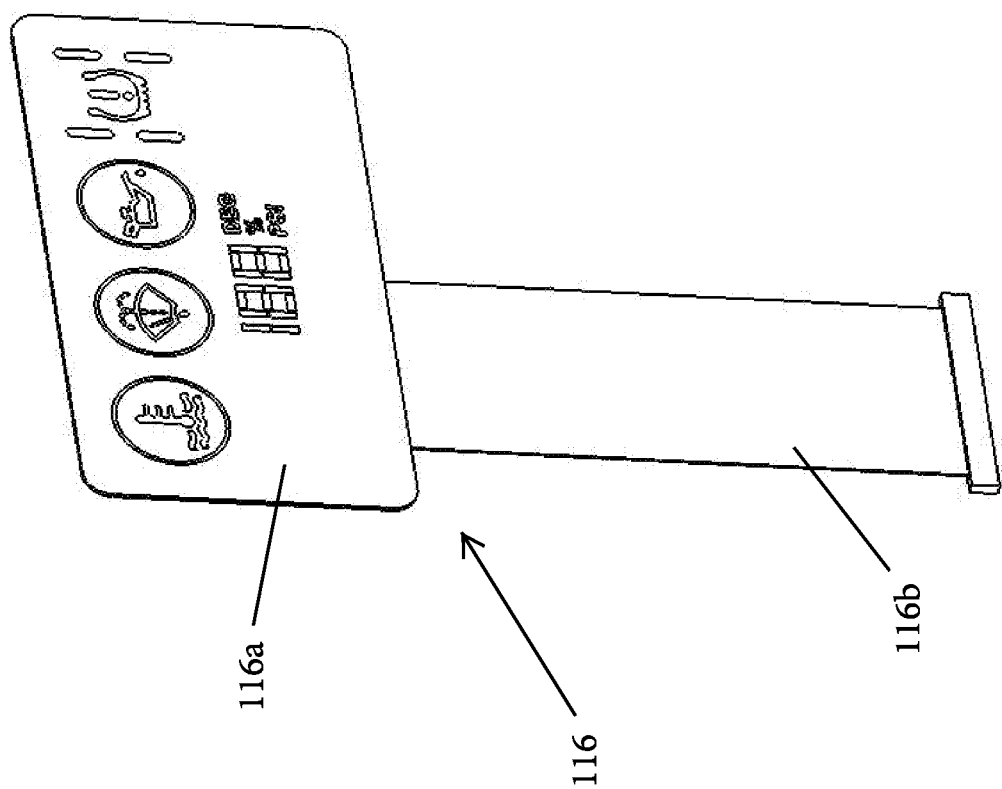
FIG. 15 is a perspective view of the display device.

As shown in FIG. 13, the window panel 114 comprises a laminated panel, with the display device disposed between adjacent layers or interlayers of polyvinyl butyral (PVB). In the illustrated embodiment, the window panel 114 comprises an outer glass panel 114*a* (which has a non-light-transmitting layer 115 (such as a ceramic frit layer or the like)

established at a surface thereof), three layers of PVB 114*b*, 114*c*, 114*d*, and an inner glass panel 114*e*. The display device 116 is disposed behind the middle PVB layer 114*c* and includes an electrical lead or wire or conductive trace 116*b* that extends between the adjacent PVB layers and extends from the window assembly for electrical connection to a vehicle wire harness when the window assembly is installed at a vehicle. Optionally, the display device may be disposed in front of the middle PVB layer (such as shown in FIG. 14).

Thus, responsive to determination of a person approaching the vehicle (such as via detection of a person approaching or via a signal from a passive entry device of the vehicle or the like), the display device may be activated to display information to the person approaching the vehicle. The person can then readily see (before entering the vehicle) the status of various vehicle systems or accessories, such as engine oil, wiper fluid, in-cabin temperature, tire pressure and/or the like, and may also be provided with a numeric indication of the value of that system or accessory. The display device is integrated in the window panel, such that the window panel (with display device integrated therein) is installed at the vehicle as a unit, whereby the display device is simply electrically connected to a vehicle wire harness or the like for power and control (such as by a door control module or electronic control module or the like of the vehicle at which the window assembly is installed). When the display device is not activated (see FIG. 16), the display device is covert and not readily discernible at the window panel (due to the transparent characteristic of the display element and/or the tint or darkening of the window panel (such as due to tinting of one or more of the PVB layers).

Therefore, the present invention provides a display device at and behind a side window of a vehicle (and/or optionally at and behind a rear window of the vehicle). The display device backlights the characters/icons so that a person outside of the vehicle can readily see the backlit/illuminated characters/icons at the window panel. The backlighting or illumination source may be activated responsive to approach of a person and/or responsive to determination of an in-cabin temperature exceeding a threshold level and/or the like.

Optionally, the window assembly or assemblies of the present invention may utilize aspects of the window assemblies described in U.S. Pat. Nos. 8,881,458; 8,402,695; 5,853,895; 5,551,197; 7,073,293; 7,003,916 and/or 6,691, 464, and/or U.S. Publication Nos. US-2018-0094471; US-2017-0066305; US-2014-0170357; US-2006-0107600; US-2008-0127563; US-2004-0020131 and/or US-2003-0213179, and/or U.S. patent applications, Ser. No. 16/019, 637, filed Jun. 27, 2018, and published Jan. 3, 2019 as U.S. Publication No. US-2019-0005755, and/or Ser. No. 15/937, 159, filed Mar. 27, 2018, and published Oct. 4, 2018 as U.S. Publication No. US-2018-0281697, which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular window assembly, said vehicular window assembly comprising:
a glass window panel, wherein said glass window panel comprises a laminate panel having an outer glass panel and an inner glass panel;
a display device;
wherein said display device comprises (i) a display element disposed between said outer glass panel and said inner glass panel and (ii) an electrical connector that extends from said display element and that extends from said glass window panel for electrical connection to a wire harness of a vehicle when said vehicular window assembly is mounted at the vehicle;
wherein said display device is operable to backlight or illuminate at least one icon or alphanumeric character, and wherein, with said vehicular window assembly mounted at the vehicle, and when the at least one icon or alphanumeric character is backlit or illuminated, the at least one icon or alphanumeric character is viewable at said glass window panel by a person exterior the vehicle; and
wherein, with said vehicular window assembly mounted at the vehicle, said display device is activated to backlight or illuminate an icon or alphanumeric character of the at least one icon or alphanumeric character responsive at least in part to determination that an in-cabin temperature of the vehicle is above a threshold level.

2. The vehicular window assembly of claim 1, wherein said display device is activated to backlight or illuminate the icon or alphanumeric character responsive at least in part to determination that the vehicle is parked.

3. The vehicular window assembly of claim 1, wherein said display device is activated to backlight or illuminate the icon or alphanumeric character responsive at least in part to determination of an occupant in the vehicle.

4. The vehicular window assembly of claim 1, wherein said display device is activated to backlight or illuminate the icon or alphanumeric character responsive at least in part to determination of a person approaching the vehicle.

5. The vehicular window assembly of claim 1, wherein said display device includes at least one illumination source that, when activated, emits light to backlight or illuminate the at least one icon or alphanumeric character.

6. The vehicular window assembly of claim 1, wherein said display device comprises a reconfigurable display device.

7. The vehicular window assembly of claim 1, wherein said display device is operable to indicate vehicle status information.

8. The vehicular window assembly of claim 7, wherein said vehicular window assembly is configured to mount at the vehicle near a fuel filling port of the vehicle, and wherein said display device displays vehicle status information when a person is filling a fuel tank of the vehicle.

9. The vehicular window assembly of claim 7, wherein said display device is activated to backlight or illuminate the at least one icon or alphanumeric character to indicate status of at least one selected from the group consisting of (i) engine temperature, (ii) tire pressure, (iii) oil life, (iv) battery charge level and (v) wiper fluid level.

10. The vehicular window assembly of claim 7, wherein the at least one icon or alphanumeric character comprises a plurality of icons or alphanumeric characters, and wherein said display device is activated to backlight or illuminate a respective icon or alphanumeric character of the plurality of icons or alphanumeric characters to indicate (a) that the in-cabin temperature of the vehicle is above the threshold level and (b) status of at least one selected from the group consisting of (i) engine temperature, (ii) tire pressure, (iii) oil life, (iv) battery charge level and (v) wiper fluid level.

11. The vehicular window assembly of claim 1, wherein said vehicular window assembly is configured to mount at the vehicle rearward of a side door of the vehicle, and wherein said display device is disposed at a lower region of said glass window panel.

12. The vehicular window assembly of claim 11, wherein said vehicular window assembly comprises a fixed or non-openable vehicular window assembly.

13. The vehicular window assembly of claim 1, wherein said glass window panel comprises a polyvinyl butyral layer disposed between said display device and said outer glass panel.

14. The vehicular window assembly of claim 13, wherein said glass window panel comprises another polyvinyl butyral layer disposed between said display device and said inner glass panel.

15. The vehicular window assembly of claim 1, wherein the at least one icon or alphanumeric character is formed at a non-light-transmitting portion of said glass window panel, and wherein, when said display device is activated, light emitted by said display device is visible through the at least one icon or alphanumeric character formed at the non-light-transmitting portion of said glass window panel.

16. The vehicular window assembly of claim 1, wherein the at least one icon or alphanumeric character is part of said display element, and wherein, when said display device is activated, light emitted by said display device is visible through at least a portion of said glass window panel.

* * * * *